United States Patent
Wang et al.

(10) Patent No.: US 9,481,020 B2
(45) Date of Patent: Nov. 1, 2016

(54) BENDING AN EDGE PORTION OF A HOUSING PANEL

(71) Applicant: Hewlett-Packard Development Company, L.P., Houston, TX (US)

(72) Inventors: Zhi-Jie Wang, Shanghai (CN); Ming-Jen Yu, Taipei (TW); Tung-Yang Hu, Taipei (TW); Kevin L. Massaro, Houston, TX (US); Chun-Pu Chen, Taipei (CN); Dimitre D. Mehandjiysky, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/763,585

(22) PCT Filed: Jan. 29, 2013

(86) PCT No.: PCT/CN2013/071064
§ 371 (c)(1),
(2) Date: Jul. 27, 2015

(87) PCT Pub. No.: WO2014/117319
PCT Pub. Date: Aug. 7, 2014

(65) Prior Publication Data
US 2015/0343510 A1    Dec. 3, 2015

(51) Int. Cl.
*B21D 5/16*    (2006.01)
*B21D 53/00*    (2006.01)
*G06F 1/16*    (2006.01)

(52) U.S. Cl.
CPC .......... *B21D 5/16* (2013.01); *B21D 53/00* (2013.01); *G06F 1/1656* (2013.01); *G06F 1/1616* (2013.01)

(58) Field of Classification Search
CPC ...... B21D 5/16; B21D 53/00; B29C 51/087; B29C 70/46
See application file for complete search history.

(56) References Cited

U.S. PATENT DOCUMENTS

| 4,242,898 | A | 1/1981 | Salvagnini |
| 5,295,384 | A | 3/1994 | Schubert |
| 5,979,214 | A | 11/1999 | Fetsch et al. |
| 7,059,164 | B2 | 6/2006 | Kobayashi |
| 7,243,524 | B2 | 7/2007 | Kinoshita |
| 2005/0127566 | A1 | 6/2005 | Chotard |
| 2010/0101297 | A1* | 4/2010 | Bauer ............ B21D 5/045 72/379.2 |

FOREIGN PATENT DOCUMENTS

CN    1251476 A    4/2000

OTHER PUBLICATIONS

International Search Report and Written Opinion, International Application No. PCT/CN2013/071064, Date of Mailing: Nov. 7, 2013, pp. 1-7.

* cited by examiner

*Primary Examiner* — Teresa M Ekiert
(74) *Attorney, Agent, or Firm* — Trop, Pruner & Hu (57) ABSTRACT

Bending members having slanted faces to engage folded edge portions of a housing panel, wherein the relative sliding movement between the folded edge portions and the bending members cause bending of each of the folded edge portions to an inwardly slanted angle.

16 Claims, 7 Drawing Sheets

BENDING AN EDGE PORTION OF A HOUSING PANEL

BACKGROUND

An electronic device can have a housing that defines an enclosure for containing components of the electronic device. The housing can be formed of various different materials, including metal or some other types of materials. Traditionally, certain portions of the housing of an electronic device can be bent at right angles with respect to each other, to form corners in the housing.

BRIEF DESCRIPTION OF THE DRAWINGS

Some embodiments are described with respect to the following figures.

DETAILED DESCRIPTION

Figure 1:
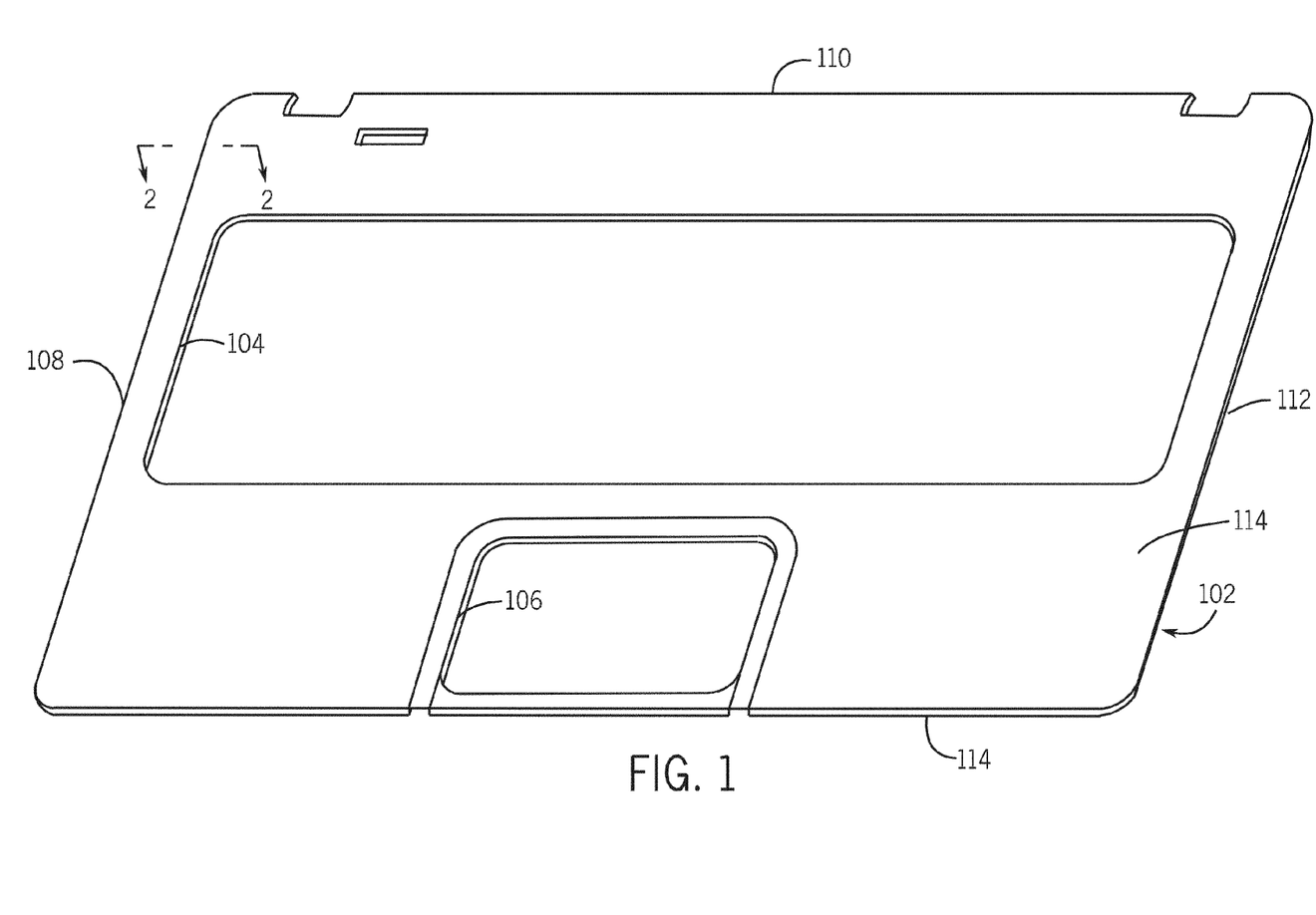
FIG. 1 is a perspective view of an example housing panel for an electronic device, formed according to some implementations.

FIG. 1 is a perspective view of a housing panel 102 that can be formed using techniques or systems according to some implementations. In the example of FIG. 1, the housing panel 102 is a keyboard deck for a notebook computer. The keyboard deck 102 includes an opening 104 for a keyboard, and an opening 106 for a trackpad. In other implementations, additional or alternative openings can be formed in a housing panel, such as small openings to form a speaker mesh, and so forth. Although reference is made to an example housing panel in FIG. 1, it is noted that in other implementations, other types of housing panels can be formed using techniques or equipments according to some implementations. More generally, a housing panel refers to at least a portion of a housing of an electronic device (or other type of device) that is used to define an enclosure in which components can be placed. Examples of electronic devices include notebook computers, tablet computers, smartphones, personal digital assistants, game appliances, routers, switches, storage devices, and so forth.

The housing panel 102 has various sides 108, 110, 112, and 114. At least some of the sides 108, 110, 112, and 114 can have folded edge portions (folded from the main portion 114 of the housing panel 102) that have inwardly slanted angles, where the edge portions are folded inwardly underneath the main portion 114 of the housing panel 102. Such folded edge portions with inwardly slanted angles are referred to as undercut edge portions.

Figure 2:
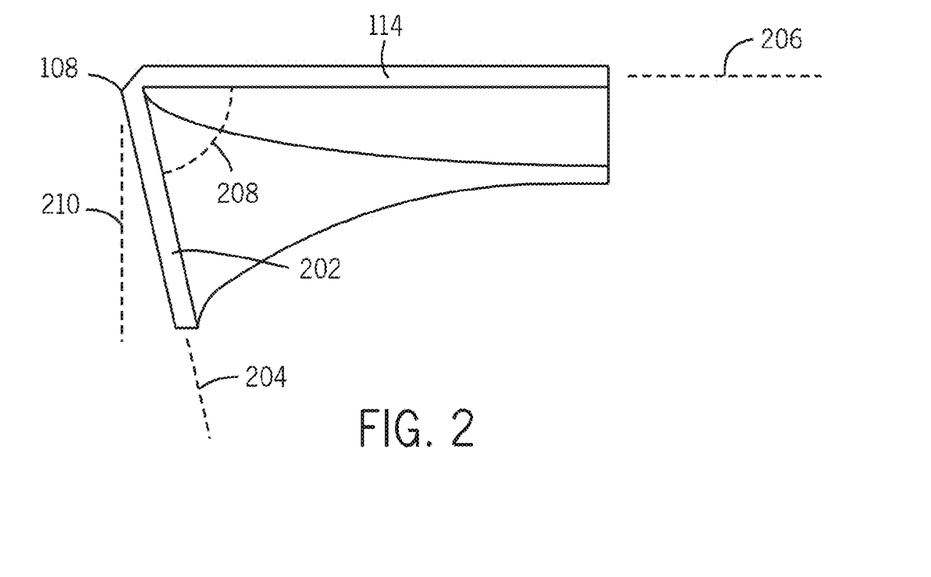
FIG. 2 is a cross-sectional view of a portion of the housing panel of FIG. 1, in accordance with some implementations.

A partial cross-sectional view of a portion of the housing panel 102 near the side 108 is shown in FIG. 2. The partial cross-sectional view of FIG. 2 is along section 2-2 in FIG. 1.

As depicted in FIG. 2, an edge portion 202 is bent with respect to the main portion 114 of the housing panel 102. The main portion 114 extends along a direction 206 (which in the view of FIG. 2 is a generally horizontal direction). The edge portion 202 extends along a direction 204, which is angled with respect to the direction 206 by an inner angle 208. The inner angle 208 is an inwardly slanted angle (or acute inner angle), since the edge portion 202 is bent inwardly with respect to the main portion 114. The inner angle 208 is defined between an inner surface of the main portion 114 and an inner surface of the edge portion 202. Stated another way, the edge portion 202 is bent past a normal angle between the edge portion 202 and the main portion 114. The normal angle is an angle between direction 206 and direction 210 in FIG. 2.

As depicted in FIG. 2, the edge portion 202 with the inwardly slanted angle is bent inwardly such that it undercuts the main portion 114 of the housing panel 102. Thus, the edge portion 202 is an undercut edge portion.

At least another one of the sides 110, 112, and 114 can also be designed with an undercut edge portion that has an inwardly slanted angle (acute inner angle) with respect to the main portion 114 of the housing panel 102.

In some examples, forming edge portions that are inwardly angled with respect to the main portion 114 can be done for aesthetic reasons, such as to distinguish products of a manufacturer or seller from products of competitors.

It can be relatively complex to form a housing panel having undercut edge portions. In some cases, depending on the manufacturing equipment used, the undercut edge portions may have to be made by employing multiple component pieces, which can add to manufacturing complexity and materials cost. For example, the undercut edge portions can be formed from component pieces that are separate from the main portion 114 of the housing panel 102. The different component pieces can then be assembled together to form the housing panel. In addition to increasing manufacturing complexity and materials costs, forming a housing panel from multiple component pieces can also be environmentally unfriendly, since additional manufacturing process steps are involved that can lead to wasted materials and increased energy usage.

In accordance with some implementations, a housing panel with undercut edge portions can be formed from a single sheet of material. This sheet can be formed of a metal or other type of material.

Figure 3:
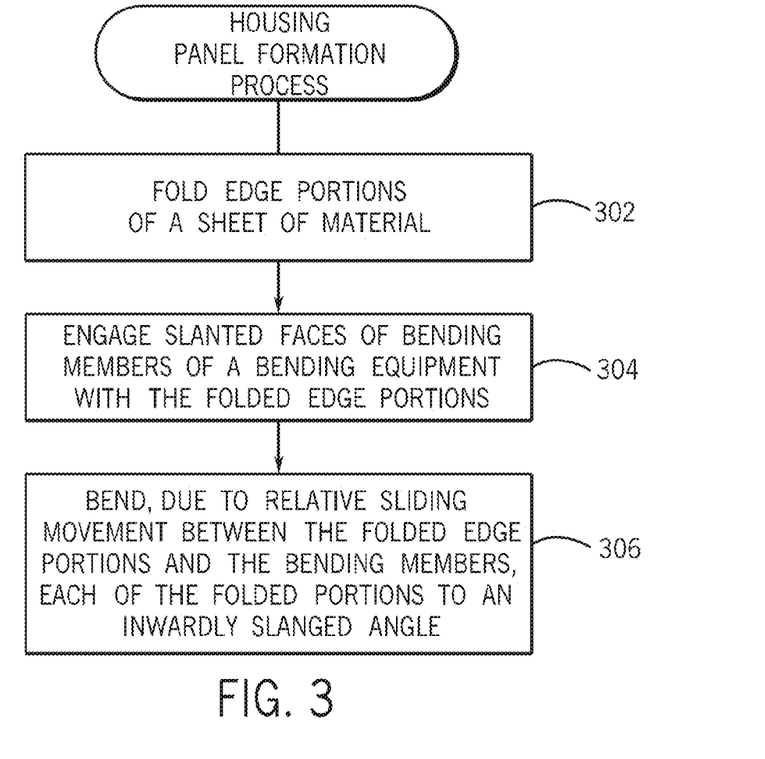
FIG. 3 is a flow diagram of a process of forming a housing panel with undercut edge portions, according to some implementations.

FIG. 3 is a flow diagram of a process according to some implementations of forming a housing panel having undercut edge portions, in accordance with some implementations. The process of FIG. 3 includes folding (at 302) edge portions of a sheet of material for forming the housing panel. Folding the edge portions can include folding the edge portions such that the edge portions are generally normal (at a right angle) with respect to the main portion of the housing panel. For example, in FIG. 2, the edge portion 202 can be initially folded such that the edge portion extends along direction 210, which is generally normal to the direction 206 in which the main portion 114 extends. The folding performed at 302 can be accomplished using a forging equipment, in some implementations.

Next, the process of FIG. 3 engages (at 304) slanted faces of bending members of a bending equipment with the folded edge portions of the sheet of material.

Next, the process of FIG. 3 bends (at 306), due to relative sliding movement between the folded edge portions and the bending members, each of the folded edge portions to an inwardly slanted angle (such as angle 208 shown in FIG. 2). This inwardly slanted angle 208 is past a normal inner angle between each respective folded edge portion and the main portion 114 of the housing panel. The relative sliding movement between the folded edge portions and the bending members based on movement of the folded edge portions, or sliding movement of the bending members, or movement of both the folded edge portions and the bending members.

The process of FIG. 3 thus is able to form a housing panel having undercut edge portions in a relatively efficient manner.

Figure 4:
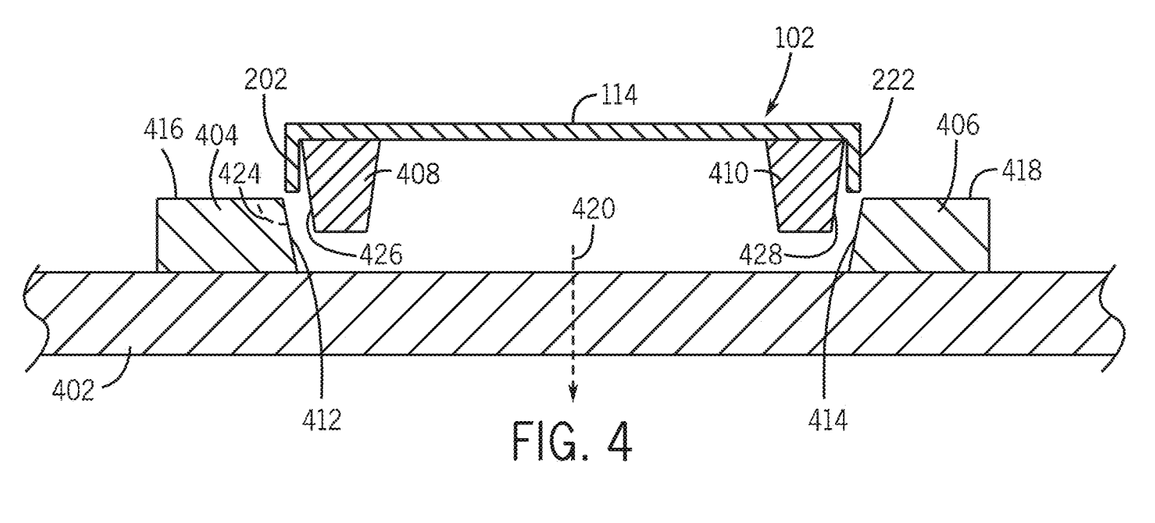
FIG. 4 is a side sectional view of a bending equipment for bending an edge portion of a housing panel to an inwardly slanted angle, according to some implementations.

FIG. 4 is a side sectional view of portions of a bending equipment that can be used for forming undercut edge portions of a housing panel according to some implementations. The bending equipment includes a support structure 402, bending members 404 and 406, and inner forming members 408 and 410. Each of the bending members 404 and 406 includes a respective slanted face 412 or 414 that is to engage a respective folded edge portion 202 or 222 of the housing panel 102. In the FIG. 4 implementation, the bending members 404 and 406 are fixed in position. However, the inner forming members 408 and 410 are moveable downwardly, as indicated by arrow 420. The folded edge portions 202 and 222 travel with the inner forming members 408 and 410. The downward movement of the inner forming members 408 and 410 causes the folded edge portions 202 and 222 to engage the slanted faces 412 and 414, respectively, of the bending members 404 and 406. After engagement, further downward movement of the inner forming members 408 and 410 causes inward bending of the folded edge portions 202 and 222 to form undercut edge portions.

The bending member 404 has a main surface 416 (which is an upper surface in the view of FIG. 4) that is generally horizontal. The slanted face 412 of the bending member 404 is angled with respect to the main surface 416. The inner angle 424 between the main surface 416 and the slanted face 412 is an obtuse angle that is greater than 90°. This angle of the slanted face 412 enables the bending member 404 to bend the folded edge portion 202 past the normal angle to the main surface 114, such that the bent edge portion 202 is undercut with respect to the main portion 114.

The inner forming member 408 of the bending equipment has a corresponding slanted face 426, which can be generally parallel to the slanted face 412 of the bending member 404. In this way, as the folded edge portion 202 moves downwardly and engages the bending member 404, the folded edge portion 202 will be pushed by the slanted face 412 against the corresponding slanted face 426 of the inner forming member 408. The slanted surfaces 412 and 426 of the bending member 404 and the inner forming member 408 cooperatively define the inwardly slanted angle of the edge portion 202.

In other examples, the slanted face 426 of the inner forming member 408 does not have to be parallel with respect to the slanted face 412 of the bending member 404. More generally, the slanted face 426 of the inner forming member 408 can be generally slanted inwardly such that it forms an acute angle (is undercut) with respect to the main surface (upper surface in the view of FIG. 4) of the inner forming member 408 that is generally horizontal in the view of FIG. 4.

The angled face 414 of the bending member 406 also has an obtuse inner angle with respect to a main surface 418 of the bending member 406. The main surface 418 is generally horizontal in the view of FIG. 4.

The inner forming member 410 similarly has a slanted face 428 that can cooperate with the slanted face 414 of the bending member 406 to form the undercut edge portion 222. The slanted face 428 is similarly undercut with respect to the main surface of the inner forming member 410, where the main surface of the inner forming member 410 is generally horizontal in the view of FIG. 4.

Figure 5A:
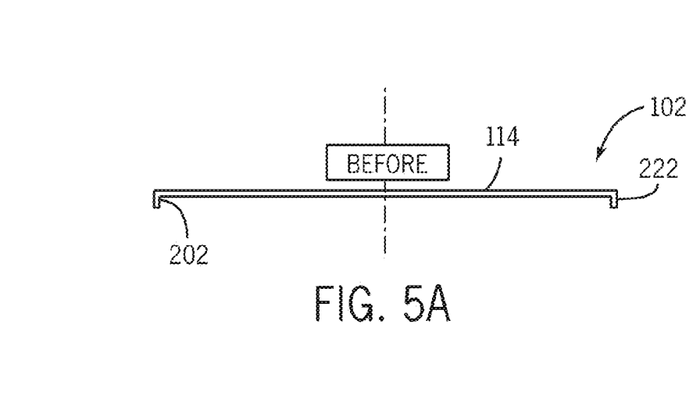
FIGS. 5A-5B are side views of a housing panel before and after, respectively, application of a bending equipment according to some implementations.

FIG. 5A depicts the housing panel 102 having edge portions 202 and 222 prior to undercut forming using a bending equipment according to some implementations. As shown in FIG. 5A, edge portions 202 and 222 are generally perpendicular to the main portion 114 of the housing panel 102.

Figure 5B:
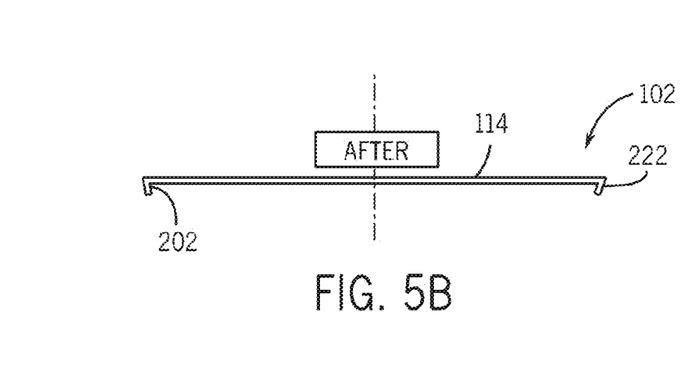

FIG. 5B shows the edge portions 202 and 222 being undercut with respect to the main portion 114, after application by the bending equipment according to some implementations.

Figure 6A:
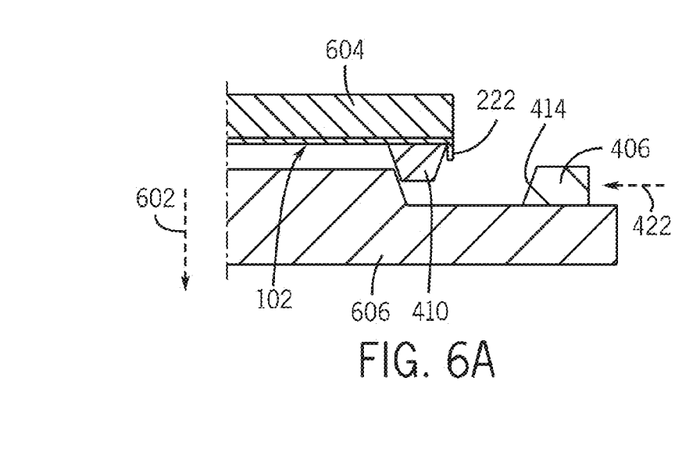
FIGS. 6A-6B are side sectional views of a portion of a bending equipment according to further implementations.
Figure 6B:
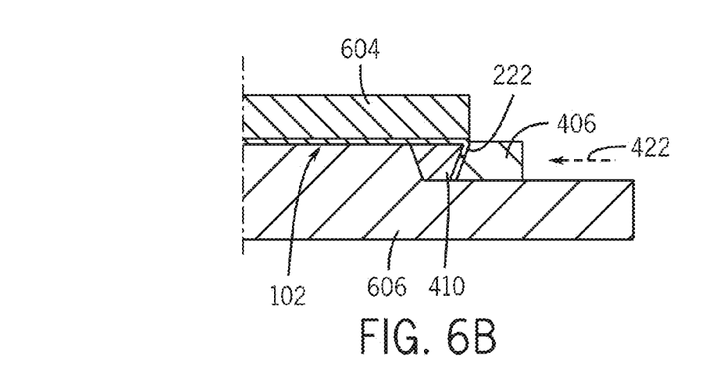

FIGS. 6A and 6B depict a portion of a bending equipment according to alternative implementations, which can be used to form the housing panel 102 depicted in FIGS. 5A-5B. In FIGS. 6A and 6B, the bending member 406 is slideable in a direction 422. Other bending member(s) of the bending equipment of FIGS. 6A-6B are similarly slideable towards the housing panel 102. Also, in the bending equipment of FIGS. 6A and 6B, the inner forming member 410 is also movable in a vertical direction, indicated by direction 602 in FIG. 6A. The inner forming member 408 is not shown in FIGS. 6A-6B, but the inner forming member 408 is similarly moveable in the vertical direction 602. The vertical direction 602 is generally perpendicular to the direction of sliding movement 422 of the bending member 406.

In FIG. 6A, the upper surface of the housing panel 102 is contacted to an upper structure 604 of the bending equipment according to further implementations. A support structure 606 depicted in FIGS. 6A-6B supports the bending member 406. During operation, the upper structure 604 is moved downwardly along direction 602, to cause the housing panel 102 and the inner forming member 410 to move downwardly together. At the same time, the bending member 406 is moved in direction 422 to engage the folded edge portion 222 of the housing panel 102. The final position of the upper structure 604, housing panel 102, inner forming member 410, and bending member 406 are depicted in FIG. 6B, where the edge portion 222 has been bent by the bending member 406 and the inner forming member 410 to become an undercut edge portion.

Figure 7A:
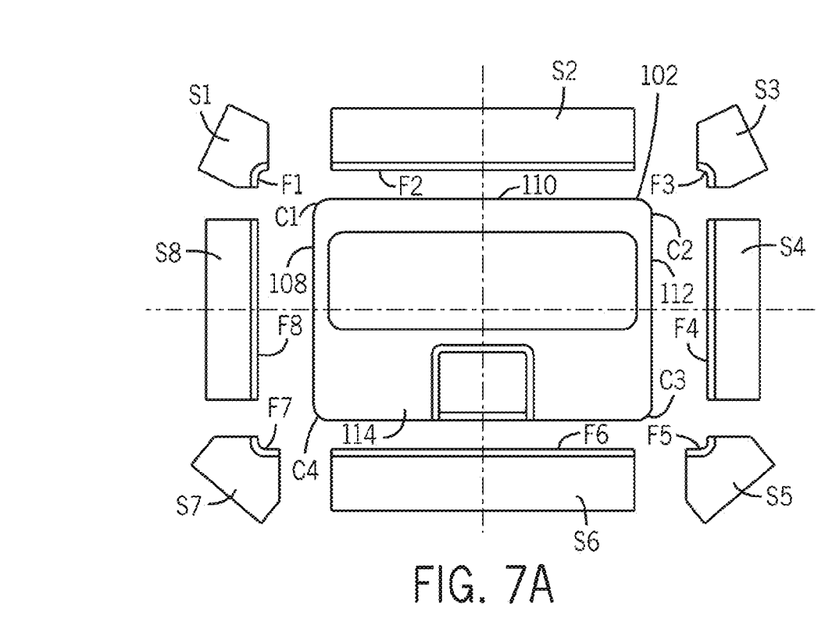
FIGS. 7A-7B are top views of a bending equipment according to further implementations.
Figure 7B:
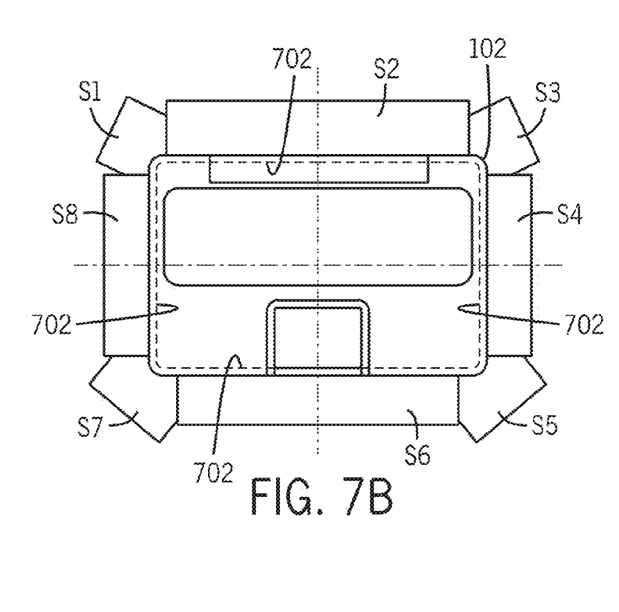

FIGS. 7A-7B is a top view of a bending equipment according to further implementations for forming undercut edge portions in the housing panel 102. FIGS. 7A-7B can be an upper view of the bending equipment of FIGS. 6A-6B. In FIGS. 7A-7B, eight slideable bending members S1-S8 are depicted, where the bending members S1-S8 are all slideable towards the housing panel 102 to form respective undercut edge portions. Each bending member S1-S8 has a respective slanted face F1-F8, similar to slanted face 414 depicted in FIG. 6A.

The bending members S8, S2, S4, and S6 are used to form undercut edge portions in the sides 108, 110, 112, and 114, respectively, of the housing panel 102. The bending members S1, S3, S5, and S7 are used to form undercut edge portions at corners C1, C2, C3, and C4, respectively, of the housing panel 102. The corner C1 is formed between sides 108 and 110, the corner C2 is formed between sides 110 and 112, the corner C3 is formed between sides 112 and 114, and the corner C4 is formed between sides 114 and 108.

During operation, the bending members S1-S8 are all moved towards the housing panel 102, with the final position of the bending members S1-S8 depicted in FIG. 7B. An inner profile 702 represents the undercut edge portions formed by the slanted faces F1-F8 of the respective bending members S1-S8.

Figure 8:
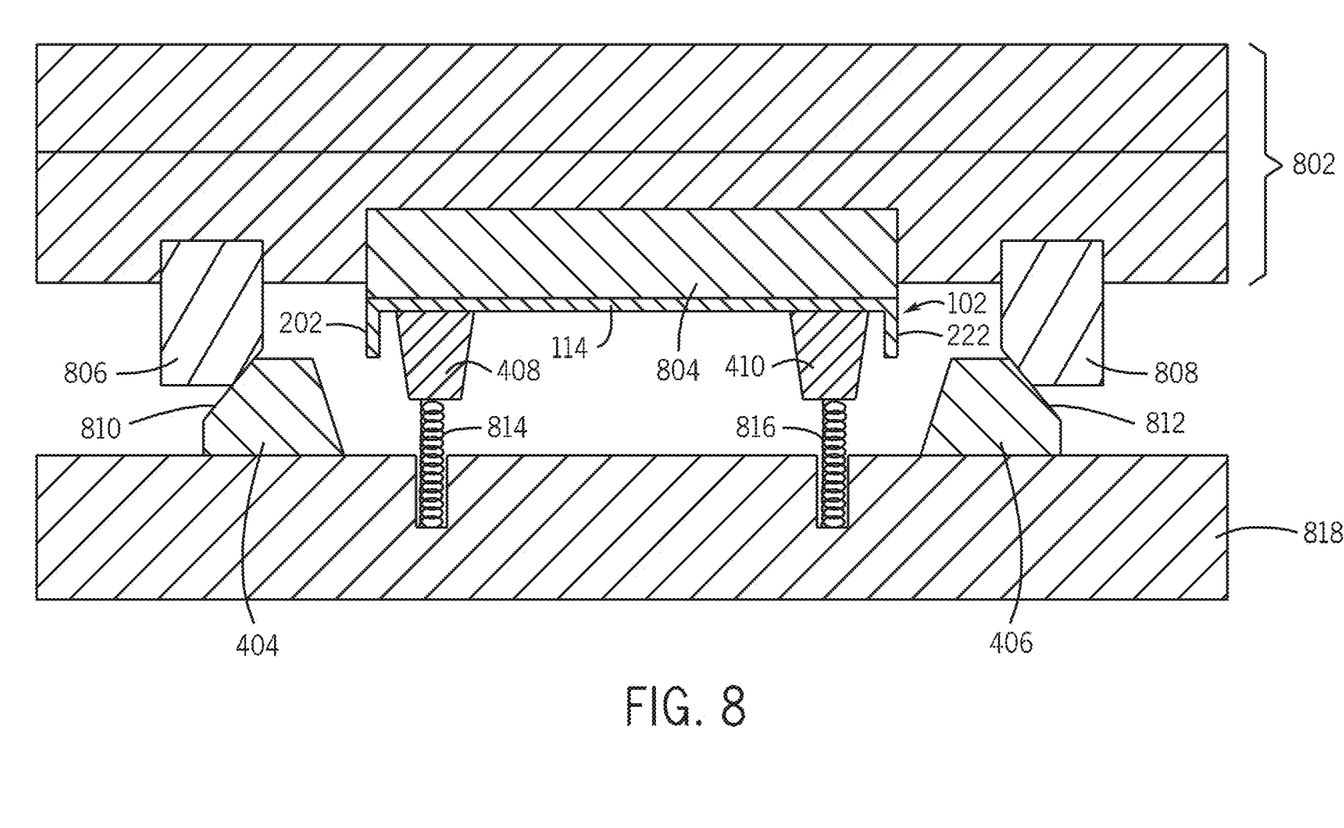
FIG. 8 is a side sectional view of a bending equipment for bending edge portions of a housing panel according to further implementations.

FIG. 8 is a sectional side view of a bending equipment according to further implementations. FIG. 8 can illustrate a variant of the bending equipment depicted in FIG. 6A-6B or 7A-7B. An upper structure 802 of the bending equipment includes an engagement plate 804 for engaging an upper surface of the main portion 114 of the housing panel 102. In addition, downwardly depending shaped jaws 806 and 808 extend from the upper structure 802. A slanted surface of each of the shaped jaws 806 and 808 engage a respective slanted surface 810 and 812 of the bending member 404 or 406.

In addition, the inner forming members 408 and 410 are biased upwardly by respective springs 814 and 816 that are engaged with a support structure 818. In other examples, other forms of biasing elements can be used for biasing the inner forming members 408 and 410 upwardly. Downward movement of the upper structure 802 pushes the housing panel 102 and the inner forming members 408 and 410 downwardly, against the biasing force of the springs 814 and 816. Moreover, downward movement of the upper structure 802 causes the shaped jaws 806 and 808 to move downwardly. The downward movement of the shaped jaws 806 and 808 causes corresponding lateral movement of the bending members 404 and 406 towards the folded edge portions 202 and 222 of the housing panel 102. The lateral movement of the bending members 404 and 406 due to downward movement of the shaped jaws 806 and 808 are caused by engagement of the respective slanted surfaces of the shaped jaws 806, 808 and slanted surfaces 810 and 812 of the bending members 404 and 406.

The downward movement of the inner forming members 408 and 410 along with the lateral movement of the bending members 404 and 406 result in a final position where the edge portions 202 and 222 are bent to form undercut edge portions as discussed above.

Figure 9:
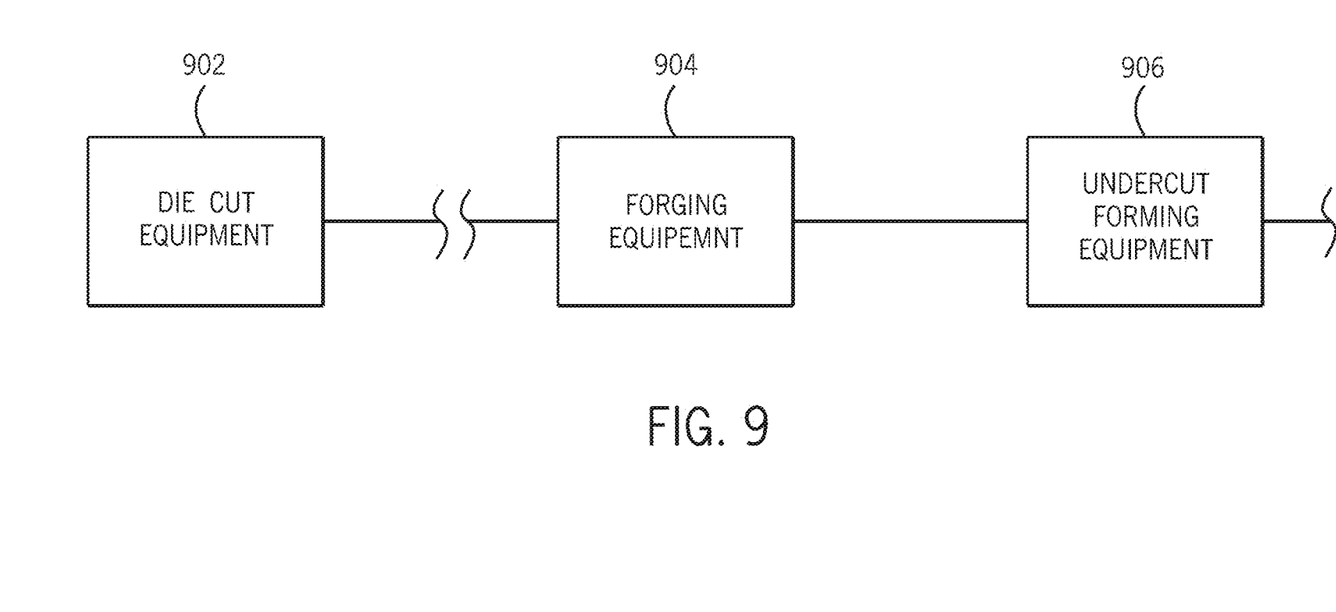
FIG. 9 is a schematic diagram of a manufacturing assembly including a bending equipment according to some implementations.

FIG. 9 is a schematic diagram of a manufacturing assembly according to some implementations. The example of FIG. 9 depicts just a subset of the equipments that are part of the manufacturing assembly, with other equipments omitted. A die cut manufacturing equipment 902 is used for cutting a sheet of material, which can include forming openings (such as those depicted in FIG. 1 as well as speaker meshes, for example).

A forging equipment 904 is used for folding the edge portions of a housing panel to generally right angles with respect to the main portion of the housing panel, similar to the configuration shown in FIG. 5A, for example.

Next, an undercut forming equipment 906 (also referred to as a bending equipment) performs bending of the folded edge portions into undercut edge portions, such as depicted in FIG. 5B, for example. The undercut forming equipment 906 can be configured according to any of the configurations shown in FIG. 4, 6A-6B, 7A-7B, or 8.

By employing techniques or equipments according to some implementations, more efficient techniques or systems of forming housing panels with undercut portions are provided. Complexity is reduced by avoiding the use of multiple component pieces to form undercut edge portions. Moreover, the simplification of the manufacturing process makes the manufacturing process more environmentally friendly in terms of materials and supply usage as well as energy consumption.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of forming a housing panel, comprising:
   folding edge portions of the housing panel;
   engaging an engagement plate of a bending equipment against a first portion of the housing panel;
   moving the engagement plate to cause movement of the folded edge portions towards slanted faces of bending members of the bending equipment; and
   bending, due to relative sliding movement, between the folded edge portions and the bending members, each of the folded edge portions to an inwardly slanted angle past a normal angle between the respective folded edge portion and the first portion of the housing panel.

2. The method of claim 1, wherein bending each of the folded edge portions to the inwardly slanted angle comprises undercutting the first portion of the housing panel.

3. The method of claim 1, wherein bending comprises bending each of the folded edge portions to correspond to a slant of the slanted face of a respective bending member.

4. The method of claim 1, wherein moving comprises moving the engagement plate in a direction that is generally perpendicular to sliding directions of the bending members, wherein the bending members are slideable towards the folded edge portions.

5. The method of claim 4, wherein moving the engagement plate comprises corresponding movement of the bending members in the sliding directions.

6. The method of claim 1, wherein bending the folded edge portions comprises bending, the folded edge portions against slanted faces of corresponding inner forming members.

7. The method of claim 6, wherein bending the folded edge portions comprises sliding the bending members to bend the folded edge portions against the slanted faces of the inner forming members.

8. The method of claim 1, wherein bending the folded edge portion comprises moving the housing panel towards the bending members fixed in position.

9. A manufacturing equipment comprising:
   bending members to slide along, sliding directions to engage slanted faces of the corresponding bending members against folded edge portions of a housing panel, wherein sliding movement of the bending members along the sliding directions causes bending of the folded edge portions into undercut edge portions that are bent inwardly with respect to a first portion of the housing panel; and
   an engagement plate to engage the first portion of the housing panel, wherein movement of the engagement plate that is generally perpendicular to the sliding directions of the bending members causes movement of the folded edge portions towards the slanted faces of the corresponding bending members.

10. The manufacturing equipment of claim 9, wherein the undercut edge portions include acute inner angles with respect to the first portion.

11. The manufacturing, equipment of claim 9, further comprising:
   inner forming members including respective slanted faces to cooperate with the slanted faces of the corresponding bending members to bend the folded edge portions inwardly to form the undercut edge portions.

12. The manufacturing equipment of claim 11, wherein the inner forming members are moveable along a direction that is different from the sliding directions.

13. The manufacturing equipment of claim 12, wherein, the direction of movement of the inner forming members is generally perpendicular to the sliding directions.

14. The manufacturing equipment of claim 9, wherein the bending members are engageable with respective sides of the housing panel to form the undercut edge portions at the respective sides, and wherein the manufacturing equipment further comprises at least one additional bending member to slide along a sliding direction to engage a slanted face of the at least one additional bending member against a folded corner portion of the housing panel, wherein sliding movement of the at least one additional bending member causes bending of the folded corner portion into a corresponding undercut corner portion.

15. The manufacturing equipment of claim 14, wherein the folded corner portion is between two of the sides of the housing panel.

16. A manufacturing assembly comprising:
   a first equipment to fold edge portions of a housing panel with respect to a first portion of the housing panel; and
   a second equipment comprising;
      bending members having slanted faces that are engageable with the folded edge portions of the housing panel, wherein relative sliding movement of the bending members with respect to the folded edge portions causes bending of the folded edge portions into undercut edge portions that are bent inwardly with respect to the first portion of the housing panel; and
      an engagement plate to engage the first portion of the housing panel, wherein movement of the engagement plate that is generally perpendicular to the relative sliding movement of the bending members causes movement of the folded edge portions towards the slanted faces of the bending members.

* * * * *